(12) United States Patent
Mikutel et al.

(10) Patent No.: US 10,970,476 B2
(45) Date of Patent: Apr. 6, 2021

(54) AUGMENTING DIGITAL INK STROKES

(71) Applicant: Microsoft Technology Licensing, LLC, Redmond, WA (US)

(72) Inventors: Ian Mikutel, Redmond, WA (US); Pravesh Agrawal, Seattle, WA (US); Kumar Pallav, Seattle, WA (US); Abdullah Rubiyath, Bellevue, WA (US); Huanhuan Xia, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 15/597,229

(22) Filed: May 17, 2017

(65) Prior Publication Data

US 2018/0336173 A1 Nov. 22, 2018

(51) Int. Cl.
| | | |
|---|---|---|
| *G06F 40/171* | (2020.01) | |
| *G06K 9/00* | (2006.01) | |
| *G06F 3/0488* | (2013.01) | |
| *G06F 40/279* | (2020.01) | |

(52) U.S. Cl.
CPC ........ *G06F 40/171* (2020.01); *G06F 3/04883* (2013.01); *G06F 40/279* (2020.01); *G06K 9/00436* (2013.01)

(58) Field of Classification Search
CPC .... G06F 17/241; G06F 40/171; G06F 40/279; G06F 3/04883; G06K 9/00436
See application file for complete search history.

(56) References Cited

U.S. PATENT DOCUMENTS

| | | | | |
|---|---|---|---|---|
| 5,970,455 A | * | 10/1999 | Wilcox | G06F 3/0488 704/270 |
| 6,256,009 B1 | * | 7/2001 | Lui | G06F 3/0485 178/18.03 |
| 6,279,014 B1 | * | 8/2001 | Schilit | G06F 17/218 715/200 |
| 6,980,202 B2 | * | 12/2005 | Carro | G06F 3/04883 345/104 |
| 7,039,234 B2 | * | 5/2006 | Geidl | G06F 40/166 382/187 |
| 7,120,872 B2 | * | 10/2006 | Thacker | G06F 3/0481 715/209 |

(Continued)

OTHER PUBLICATIONS

Wilcox et al., "Dynomite: A Dynamically Organized Ink and Audio Notebook," 1998 (Year: 1998).*

(Continued)

*Primary Examiner* — Andrew R Dyer
(74) *Attorney, Agent, or Firm* — Talem IP Law, LLP (57) ABSTRACT

A content creation application with an ink augmenting feature can communicate at least one recognized term from ink strokes input to a canvas interface of the content creation application to an ink augmenting service. The content creation application can receive at least one keyword from the ink augmenting service, where each keyword indicates a corresponding recognized term having available content identified by the ink augmenting service. The content creation application then transforms a grouping of the ink strokes corresponding to the recognized term indicated by each keyword to an actionable item in the canvas interface. Selection of the actionable item invokes the command to provide the available content.

17 Claims, 9 Drawing Sheets

(56) References Cited

U.S. PATENT DOCUMENTS

| | | | | |
|---|---|---|---|---|
| 7,174,042 B1* | 2/2007 | Simmons | | G06K 9/00402 345/169 |
| 7,647,555 B1* | 1/2010 | Wilcox | | G11B 27/11 715/721 |
| 7,680,332 B2* | 3/2010 | Ye | | G06K 9/00416 382/186 |
| 7,693,842 B2 | 4/2010 | Hinckley et al. | | |
| 7,793,233 B1* | 9/2010 | Sellers | | G06F 40/169 715/805 |
| 7,925,663 B2 | 4/2011 | Napper et al. | | |
| 8,041,120 B2 | 10/2011 | Zhang et al. | | |
| 8,315,482 B2* | 11/2012 | Hou | | G06K 9/00422 382/101 |
| 8,503,788 B2* | 8/2013 | Woo | | G06K 9/6255 382/185 |
| 8,943,092 B2* | 1/2015 | Dai | | G06F 16/2455 707/769 |
| 9,182,905 B2* | 11/2015 | Lee | | G06F 3/04883 |
| 9,256,362 B2* | 2/2016 | Yamamoto | | G06F 3/04855 |
| 2003/0071850 A1* | 4/2003 | Geidl | | G06F 3/0481 715/781 |
| 2003/0210817 A1* | 11/2003 | Hullender | | G06K 9/222 382/187 |
| 2003/0214536 A1* | 11/2003 | Jarrett | | G06F 3/0481 715/831 |
| 2003/0215139 A1* | 11/2003 | Shilman | | G06K 9/00409 382/186 |
| 2004/0001649 A1* | 1/2004 | Simmons | | G06K 9/222 382/321 |
| 2004/0021700 A1* | 2/2004 | Iwema | | G06K 9/00436 715/863 |
| 2004/0196313 A1* | 10/2004 | Wynn | | G06F 17/242 715/779 |
| 2004/0228532 A1* | 11/2004 | Fernandez | | G06F 3/03545 382/187 |
| 2005/0052433 A1* | 3/2005 | Silverman | | G06F 3/04883 345/179 |
| 2005/0128181 A1* | 6/2005 | Wang | | G06K 9/00436 345/156 |
| 2006/0210173 A1* | 9/2006 | Jurion | | G06K 9/00436 382/229 |
| 2006/0277159 A1* | 12/2006 | Napper | | G06F 17/242 |
| 2007/0003142 A1* | 1/2007 | Simard | | G06K 9/00416 382/187 |
| 2008/0292190 A1* | 11/2008 | Biswas | | G06K 9/00402 382/187 |
| 2009/0003658 A1 | 1/2009 | Zhang et al. | | |
| 2009/0193342 A1* | 7/2009 | Barthelmess | | G06F 40/171 715/751 |
| 2009/0304283 A1* | 12/2009 | Predovic | | G06K 9/00436 382/189 |
| 2012/0212423 A1* | 8/2012 | Dondurur | | G06F 3/04883 345/173 |
| 2012/0281020 A1* | 11/2012 | Yamamoto | | G06F 3/04855 345/660 |
| 2012/0297294 A1* | 11/2012 | Scott | | G06F 40/242 715/261 |
| 2013/0033461 A1* | 2/2013 | Silverbrook | | G06F 3/0321 345/179 |
| 2014/0250143 A1* | 9/2014 | Dai | | G06K 9/222 707/769 |
| 2015/0121179 A1* | 4/2015 | Saund | | G06F 3/04842 715/202 |
| 2016/0048318 A1 | 2/2016 | Markiewicz | | |
| 2016/0179224 A1* | 6/2016 | Zhang | | G06F 3/04883 345/156 |
| 2016/0179363 A1* | 6/2016 | VanBlon | | G06F 3/04883 715/856 |
| 2016/0179764 A1* | 6/2016 | Kelso | | G06F 17/211 715/244 |
| 2016/0180160 A1* | 6/2016 | VanBlon | | G06F 3/04883 382/189 |
| 2016/0253555 A1* | 9/2016 | Zhang | | G06K 9/00402 382/189 |
| 2017/0109032 A1* | 4/2017 | Melinand | | G06K 9/00402 |
| 2017/0277671 A1* | 9/2017 | Duggan | | G01C 21/3632 |
| 2018/0095653 A1* | 4/2018 | Hasek | | G06F 3/0412 |

OTHER PUBLICATIONS

Tay, et al., "Improving Digital Ink Interpretation through Expected Type Prediction and Dynamic Dispatch", in Proceedings of 19th International Conference on Pattern Recognition, Dec. 8, 2008, 4 pages.

Weins, Connor, "Digital Ink-Ink Interaction in Windows 10", https://msdn.microsoft.com/en-us/magazine/mt590975.aspx?f=255&MSPPError=-2147217396, Published on: 2015, 11 pages.

Egger, Markus, "Ink Recognition and Ink Analysis", http://www.codemag.com/Article/0512042, Published on: 1993, 25 pages.

"Understanding Strokes and Digital Ink", https://www.codeproject.com/Articles/17925/Understanding-Strokes-and-Digital-Ink, Published on: Mar. 20, 2007, 6 pages.

* cited by examiner

AUGMENTING DIGITAL INK STROKES

BACKGROUND

Digital ink strokes are markings that are represented by a set of properties and point data that a digitizer captures. It can be the set of data that is captured in a single pen down, up, or move sequence. The act of generating the digital ink strokes can be referred to as "inking" and may be accomplished via input mechanisms of a stylus or pen (or even user finger on a touch screen or pad) that capture handwriting in its natural form.

BRIEF SUMMARY

An ink augmenting feature and an ink augmenting service are provided for augmenting digital ink strokes for content creation applications. The ink augmenting feature of the content creation application and ink augmenting service can transform digital ink strokes to an actionable item that may then be acted upon to obtain relevant content.

A content creation application with an ink augmenting feature can transform groupings of ink strokes to an actionable item. The actionable item initiates an action that augments the ink strokes, enhancing the content being authored. Transforming the ink strokes to an actionable item allows a user to select the actionable item to obtain any available content identified by an augmenting service. For example, a content creation application with the ink augmenting feature can communicate at least one recognized term from inked content input as ink strokes through a canvas interface of the content creation application, along with context information, to an ink augmenting service. The content creation application can receive, from the ink augmenting service, at least one keyword identified from the at least one recognized term sent to the ink augmenting service. The at least one keyword indicates that the corresponding recognized term has available content identified by the augmenting service for augmenting the digital ink strokes. The content creation application can transform the ink strokes of an inked word corresponding to the keyword into an actionable item. Then, when a user selects the actionable item, the content creation application can augment the authored content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An ink augmenting feature and an ink augmenting service are provided for augmenting digital ink strokes for content creation applications. The ink augmenting feature of the content creation application and ink augmenting service can transform digital ink strokes to an actionable item that may then be acted upon to obtain relevant content.

Content creation applications are software applications in which users can contribute and/or modify content. The content can be visual content where users can create text and/or image-based content in digital form. The term "content creation application" may in some cases by synonymous with "content authoring application", "productivity application", or "content authoring tool", and such terms may be used interchangeably herein.

There is a vast amount of digital information available to users, as well as an abundance of ways to access this information, including via search engines (separate from or integrated with certain content creation applications) where users may type a query in an input field and obtain a result. In a touch-based environment, typing terms on a displayed keyboard can take time. In addition, when in an inking environment, it can be desirable to avoid switching between inking and typing.

The described ink augmenting feature is suitable for any content creation application that supports inking. As explained above, digital ink strokes (of an "inking") are markings that are represented by a set of properties and point data that a digitizer capture.

During typical inking capture, a digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected. The collected information provides a set of data defining an ink stroke.

The set of data can include parameters such as, but not limited to, a beginning of the stroke, an end of the stroke, the pressure of the stroke, the tilt (e.g., of the pen), the direction of the stroke, the time and timing of the stroke between discrete coordinates along the path of the stroke, and the color of the 'ink'.

A content creation application that supports inking can also include an ink analyzer. An ink analyzer is a feature that analyzes the ink strokes and identifies inked terms and other recognizable groupings of ink strokes. A grouping of ink strokes that are identified as forming a drawn unit (e.g., term or drawing) can be considered stored within a data structure of an ink container. The ink container can include metadata associated with the word or drawing as a whole, as well as the ink stroke parameters for each ink stroke in the ink container.

According to various implementations described herein, the grouping of ink strokes defined by the ink container can be transformed into an actionable item. In some cases, the ink container includes a command parameter that, when assigned a value, can cause a selection action (e.g., encircling or touch) of at least a portion of the grouping of ink strokes to carry out the command action. The grouping of ink strokes can be replaced with an image of the grouping of strokes. The image can have highlighting or other visual indicators of being an action item.

The ink augmenting feature allows for the transformation of ink strokes to actionable items, allowing a user to select the item to obtain available information, augmenting the inked content. Advantageously, the ink strokes can transform into actionable items that can function as a "search"

button that brings in augmented content without having to leave the inking environment.

Figure 1:
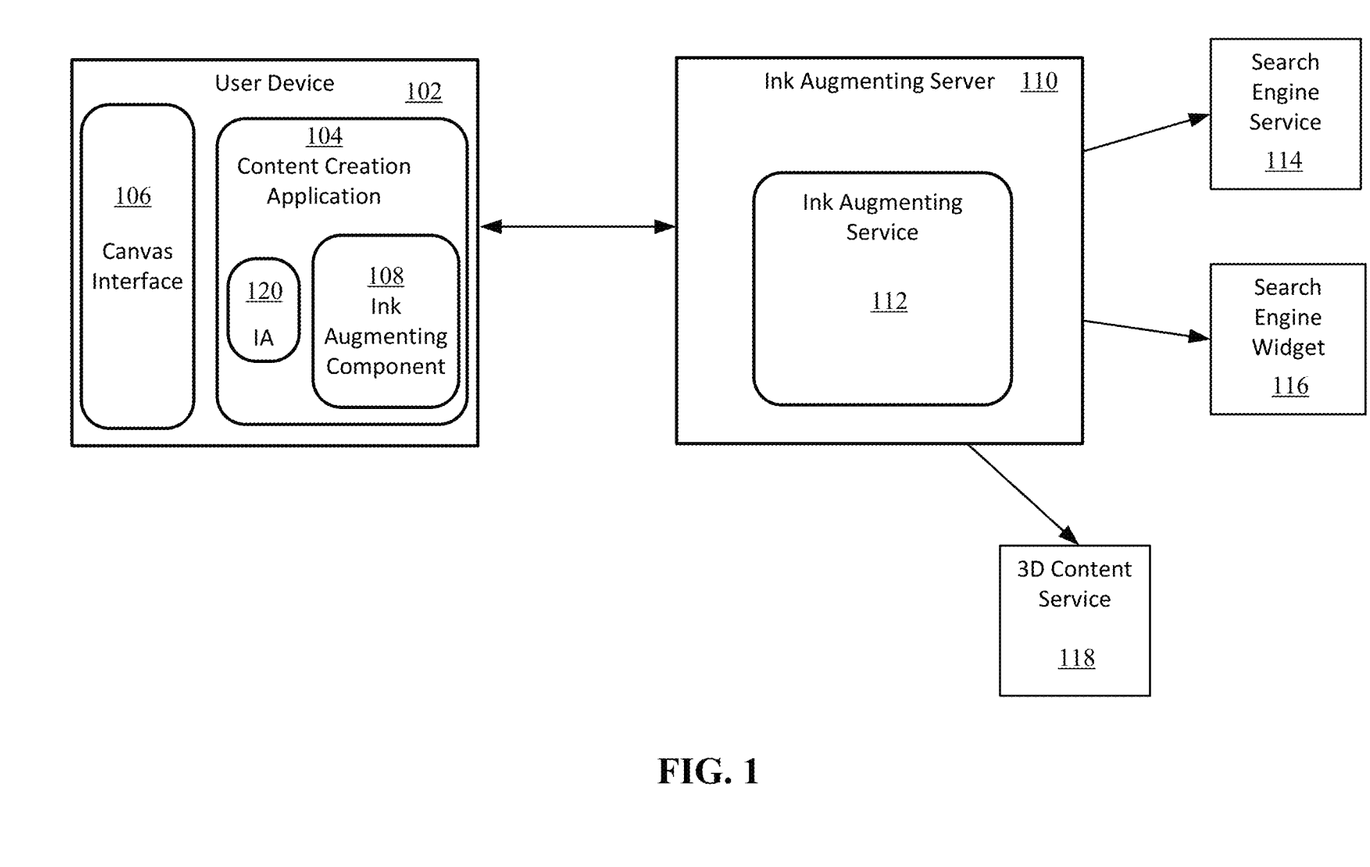
FIG. 1 illustrates an example operating environment in which various embodiments of the invention may be carried out.
Figure 2:
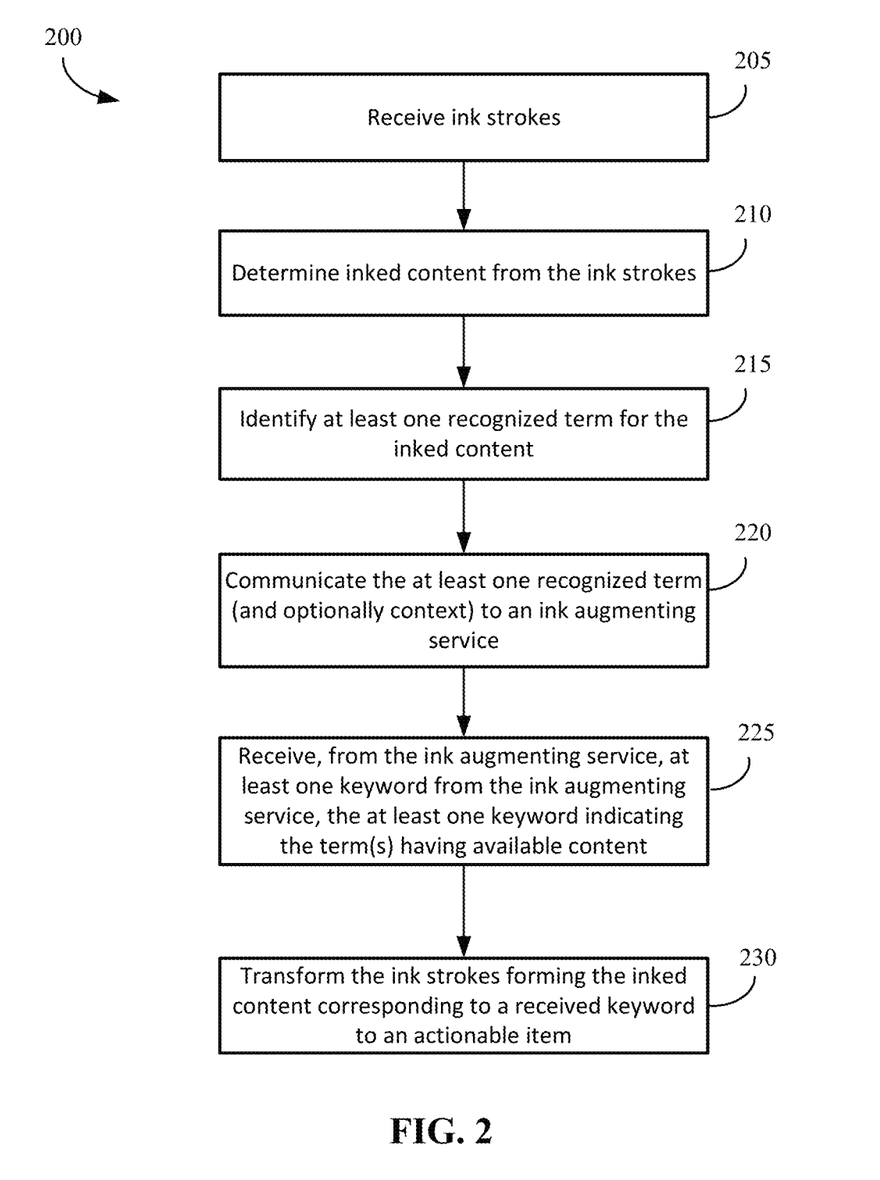
FIG. 2 illustrates an example process flow diagram of a method for augmenting ink strokes.

FIG. 1 illustrates an example operating environment in which various embodiments of the invention may be carried out; and FIG. 2 illustrates an example process flow diagram of a method for augmenting ink strokes.

Referring to FIG. 1, the example operating environment may include a user device 102 running a content creation application 104 with a content creation application canvas interface 106, an ink augmenting component 108, an ink augmenting server 110 implementing an ink augmenting service 112, and one or more services, such as a search engine service 114 (e.g., providing a knowledge graph), a search engine widget 116 (e.g., a scoped or scenario specific knowledgebase), and a 3D content service 118 (e.g., a service providing 3D assets).

Figure 4:
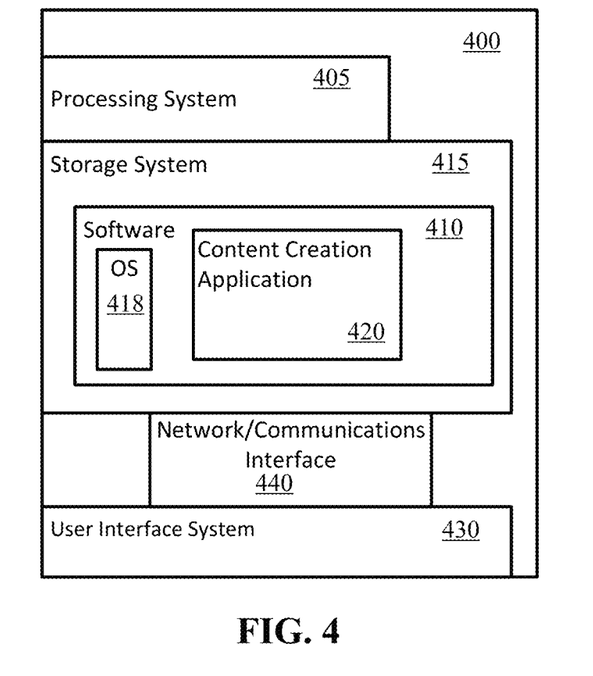
FIG. 4 illustrates components of a computing device that may be used in certain embodiments described herein.

User device 102 may be a computing device such as described with respect to system 400 of FIG. 4. The user device 102 may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, a whiteboard, or a smart television.

The canvas interface 106 can refer to the graphical user interface through which content appears to be created, conceptually being a substrate for a work of authorship.

The ink augmenting component 108 can be a standalone application providing a portal to the ink augmenting service 112 or an ink augmenting feature of the content creation application 104 to provide the functionality within the content creation application 104.

In some cases, the content creation application 104 includes an ink analyzer (IA) 120. In some cases, the content creation application 104 communicates with an external (to the application 104 or even external to the user device 102) IA.

Components (computing systems, storage resources, and the like) in the operating environment may operate on or in communication with each other over a network (not shown). The network can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as understood by those skilled in the art.

Communication to and from the components, such as from the ink augmenting feature and the ink augmenting service, may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

In response to receiving particular user interactions with the user device 102 by a user, the ink augmenting component 108 may facilitate a call (or invocation) of the ink augmenting service 112 using the API of the ink augmenting service 112 so that the ink augmenting service 110 may execute one or more operations to provide keywords and available content, including those described with respect to FIG. 2. Ink augmenting component 108 may also, in some cases, facilitate the presentation of the digital ink strokes, for example, by providing the digital ink strokes for input to a user interface of a content creation application (e.g., whiteboard application, notebook application, and the like).

Figure 5:
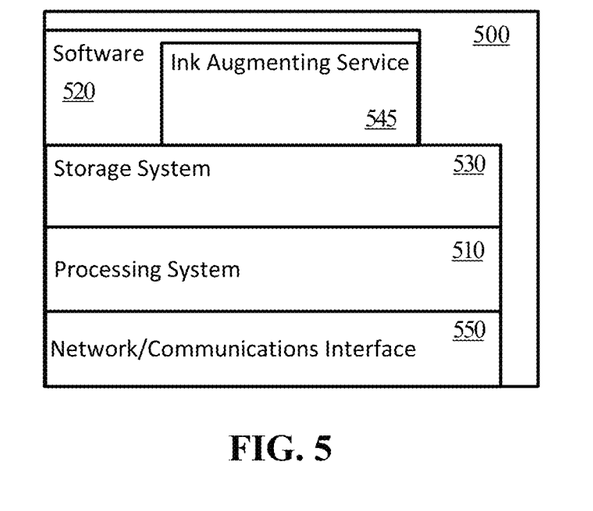
FIG. 5 illustrates components of a computing system that may be used to implement certain methods and services described herein.

Referring to both FIG. 1 and FIG. 2, the content creation application 104 performing process 200 described with respect to FIG. 2 via the ink augmenting component 108, can be implemented by user device 102, which can be embodied as described with respect to computing system 400 shown in FIG. 4 and even, in whole or in part, by the ink augmenting server 110, which can be embodied as described with respect to computing system 500 as shown in FIG. 5.

The content creation application 104 can receive (205), for example via the canvas interface 106 of the content creation application 104, ink strokes from a user. The ink strokes form inked content, for example, an inked term or an inked drawing handwritten to the canvas interface 106 by the user. The inked term may be, for example, a word, a phrase, a scientific term (e.g., a math term or a chemistry term), or other special notation and can include characters such as, letters, numbers, symbols, and punctuation. The content creation application 104 (for example via the ink analyzer 120) can determine (210) groupings of ink strokes that form inked content and identify (215) at least one recognized term for the inked content.

The content creation application 104 can communicate (220), via the ink augmenting component 108, at least one recognized term corresponding to inked terms or inked drawings that are input as ink strokes through the canvas interface 106 (and in some cases further communicate context information) from the canvas interface 106 to the ink augmenting service 112.

In some cases, the communication to the ink augmenting service 112 may be in response to receiving the ink strokes from the canvas interface 106. The communication can be automatic. For example, the content curation application 104 may communicate the at least one recognized term corresponding to the inked terms and inked drawings anytime the user inputs an ink stroke through the canvas interface 106. In other cases, the communication to the ink augmenting service 112 may be in response to receiving a request from the user to perform the ink augmentation, such as a selection of an ink augmentation command.

The content creation application 104 may run the IA 120 to perform ink analysis on the received ink strokes to identify the at least one recognized term from the ink strokes prior to communicating the inked term to the ink augmenting service 112. The IA 120 may run as an automatic background process and/or upon command of the user. The IA 120 can recognize the at least one recognized term and determine a text-based version (e.g., a typeset string of characters) of the inked term or inked drawing. For example, a user may ink the word "truck" on the UI 106 of the content creation application 104. The content creation application 104 can then run the IA 120. The IA 120 can analyze the ink strokes and determine that a string of characters forming the word "truck" was inked. The content creation application 104 may then communicate the character string of the identified term corresponding to the inked term or inked drawing to the ink augmenting service 112.

In some cases, the IA 116 may be included in a service separate from the content creation application 104. In this case, the content creation application 104 may communicate with a separate service that includes the IA 120 to perform the ink analysis to identify the at least one recognized term. The content creation application 104 may then communicate the character string of the at least one recognized term to the ink augmenting service 112.

In a case where the IA 120 is included with the ink augmenting service 112, the content creation application 104 may communicate the ink container of the inked term or inked drawing to the ink augmenting service 112. In this case, the ink augmenting service 112 may then run the IA to perform ink analysis on the received ink strokes to identify an inked term from the ink strokes.

Additionally, the content creation application 104 can communicate the context information from the canvas interface 106 to the ink augmenting service 112. In some cases, the IA 120 may help determine context information sent to the ink augmenting service 112. The context information may include, for example, metadata corresponding to additional information about the content creation application 104, such as a user identifier and location information, and metadata corresponding to information that the user has written on the canvas interface 106. For example, the context information may include that the user is in a classroom and has drawn chemical molecules on the canvas interface 106. The IA 120 can then determine that the user is in a chemistry class. Then, if the user writes the word "gold" on the canvas interface 106, the IA 120 can infer that the word "gold" is related to chemistry and is the chemical element, not a gold coin or Olympic gold medal.

In another example, a user may write the word "Canada" on the canvas interface 106. The IA 120 may perform ink analysis to determine that the inked word is "Canada" and is related to the country of Canada. However, if the user continues to write "Day" on the same line, the IA 120 may re-analyze the ink strokes to determine that the user is referring to the event "Canada Day" and not the country "Canada".

The ink augmenting service 112 can receive the inked terms and inked drawings and context information from the content creation application 104. As previously described, if the ink analysis is performed by the IA 120 included in the content creation application 104 or an IA service, the ink augmenting service 112 can receive the inked terms and inked drawings as a character string identifying the inked terms and inked drawings. If the ink analysis is being performed at the ink augmenting service 112, then the ink augmenting service 112 may receive the ink containers of the inked terms and inked drawings and run the IA 120 to perform the ink analysis and identify the at least one recognized term (as a character string) related to the inked terms and inked drawings.

The ink augmenting service 112 can then pass the recognized term to a variety of sources to perform a search query for results that include available content that matches the recognized term. The sources may include, but are not limited to, the search engine service 114, such as Microsoft Bing®, the search engine widget 116, such as the Microsoft Bing® Knowledge Widget, and the 3D content service 118, such as Remix 3D from Microsoft®.

The ink augmenting service 112 may query multiple sources for each recognized term. Additionally, the ink augmenting service 112 may use the results of the query to determine if there is actionable content for the recognized term. Actionable content refers to content results that may be relevant (e.g., associated with or related to an entity identified from the recognized term). The recognized term may have actionable content if there is relevant available content for the recognized term. Further, the ink augmenting service 112 can determine keywords corresponding to the context information from the from the results of the query. The keywords can indicate that there is available content for the at least one recognized term corresponding to the inked term or inked drawing. For example, if the at least one recognized term has actionable content, then the recognized term may be identified as a keyword.

The ink augmenting service 112 can receive available content (at least some of which may be the "actionable content") from one or more of the multiple sources. The available content may include, for example, 3D drawings, images, definitions, or other information related to the at least one recognized term. The ink augmenting service 112 can then determine which of the available content received is relevant to the context information. Since a recognized term may have different meanings, a portion of the available content the ink augmenting service 112 receives may not be relevant. For example, if a user wrote the word "Chelsea" on the UI 106, the ink augmenting service 112 may receive available content related to each of the different meanings. The available content can be related to, for example, a name of a person, such as the comedian Chelsea Handler, a name of a place, such as a neighborhood in Manhattan, N.Y., or an area in London, England, or a professional football team. However, if the word "Chelsea" was followed by a phrase such as "beat Manchester United", the IA 120 can determine that the recognized term "Chelsea" is referring to the Chelsea Football Club and can include that in the context information. The ink augmenting service 112 can use the context information to determine the available content that is related to the Chelsea Football Club. In this case, the term "Chelsea" is a keyword and the available content related to Chelsea Football Club is the actionable content.

The ink augmenting service 112 can then send the information to the content creation application 104. The information sent by the ink augmenting service 112 includes at least one keyword. In some cases, the information may further include a list of the available content. In some cases, the information sent by the ink augmenting service 112 may include the at least one keyword, the list of the available content, as well as the available content itself.

The content creation application 104 can receive (225) the at least one keyword from the ink augmenting service 112. The at least one keyword can indicate available content for the at least one recognized term corresponding to the inked term or inked drawing that was communicated to the ink augmenting service 112 in step 220. The content creation application 104 can then transform the ink strokes corresponding to the at least one keyword to an actionable item (230).

Ink strokes are transformed into the actionable item by changing a grouping of ink strokes from the ink strokes input through the UI 106 to a command item or icon. The actionable item allows a user to select the command item or icon to obtain additional available content, augmenting the ink strokes. The ink strokes forming the inked content corresponding to the at least one keyword are grouped together as one entity and that entity is transformed to an actionable item. In some cases, the ink container includes a command parameter that, when assigned a value, can effect a command action when at least a portion of the grouping of the ink strokes of the ink container is selected. The grouping of ink strokes can be replaced with an image or icon. The image can have highlighting or other visual indicators of being an action item, or the grouping of ink strokes themselves can have a highlighting effect or other visual indication applied.

The content creation application 104 can have visual affordances that notify the user that there is additional information related to the inked word or inked drawing input by the user. For example, the actionable item can be presented in the UI 106 as a highlighted word or highlighted unit. The user can use one or more touches to interact with the actionable item. Advantageously, a user's inked content transforms into an actionable item that allows a user to interact directly with the content to augment the content. In some cases, the actionable item functions as a direct search button that brings back relevant results to the user.

In some cases, there may be multiple action items on one view screen of the content creation application 104 where more than one keyword is identified for the content. The content creation application 104 may proactively perform the ink augmentation. For example, the content creation application 104 may actively perform the ink augmentation feature without an interruption to the user.

In response to receiving a selection of the actionable item, the content creation application 104 can retrieve the results (e.g., the additional information) the ink augmenting service 112 obtained from the multiple sources. As previously described, in some cases, the content creation application 104 may have already received the results from the ink augmenting service 112.

Once the content creation application 104 has the results, the content creation application 104 can surface a user interface displaying the results of the selected keyword. The results may be displayed a variety of ways. For example, the results may be presented to the user in a "preview" manner. The "preview" manner may include a list of the results, thumbnails of an image or content, or other preview format.

As previously discussed, the results may include 3D content, images, definitions, or other information relevant to the inked term or inked drawing and the context information. The user may then decide if any of the additional content should be inserted into the canvas interface 106.

The content creation application 104 may then insert results of a selected keyword into the canvas interface 106 to augment the inked content. In some cases, the content creation application 104 may have already received the content of the selected result and can insert the selected result without retrieving the available content from the ink augmenting service 112. In other cases, the results may initially be thumbnails or other preview format (e.g., the list of content) and only after selection of one of the results (for insertion into the canvas interface) by a user would the full content be provided to the content creation application 104 by the ink augmenting service 112.

The selected result may be inserted anywhere in the canvas interface 106. The selected result may or may not replace the actionable item, depending on implementation. In some cases, the inserted content may be modifiable or have embedded functionality. For example, a user may be able to rotate 3D content, even when the 3D content has been embedded on the canvas interface 106.

In some cases, the content creation application 104 may return the actionable item to the original ink strokes. The content creation application 104 may return the actionable item to the original ink strokes or other format according design choice for the application. For example, the content creation application 104 may return the actionable item to the original ink strokes (or other format such as a grouping of ink strokes) in response to a request from a user selecting a user command to return the actionable item into a previous or other state.

FIGS. 3A-3F illustrate example scenarios of augmenting ink carried out at a content curation application. A user may open a canvas interface 305 of a content creation application 300 on their computing device (embodied, for example, as system 400 described with respect to FIG. 4). The computing device can be any computing device such as, but not limited to, a laptop computer, a desktop computer, a tablet, a personal digital assistant, a smart phone, a smart television, a gaming console, wearable device, and the like.

Figure 3A:
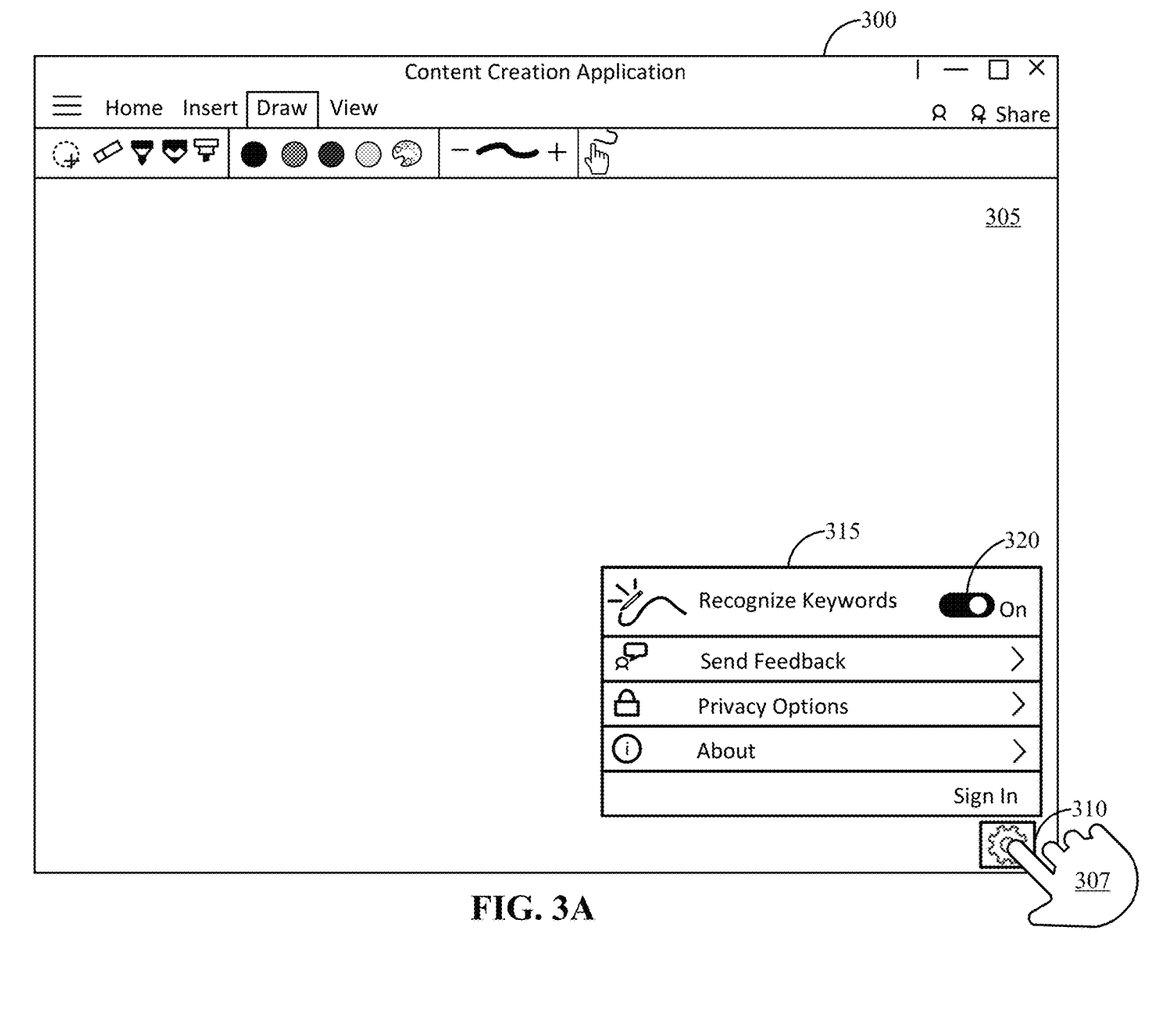
FIGS. 3A-3F example scenarios of augmenting ink strokes carried out at a content curation application.

Referring to FIG. 3A, the user may select (307) a settings command 310 in the canvas interface 305 of the content creation application 300. Upon selecting the settings command 310, a settings menu 315 may be displayed to the user. The settings menu 315 may include a command for an ink augmenting functionality, such as a recognize keywords command 315. The user may switch a toggle 320 of the recognize keywords command 315 to the "on" position, as shown in the illustrated example, to begin receiving the ink augmenting functionality. It is to be understood that the ink augmenting feature of the content creation application 300 may be initiated by any suitable method—direct or indirectly performed by a user—and the illustration of FIG. 3A is meant to be illustrative of one mechanism to initiate the ink augmenting feature.

Figure 3B:
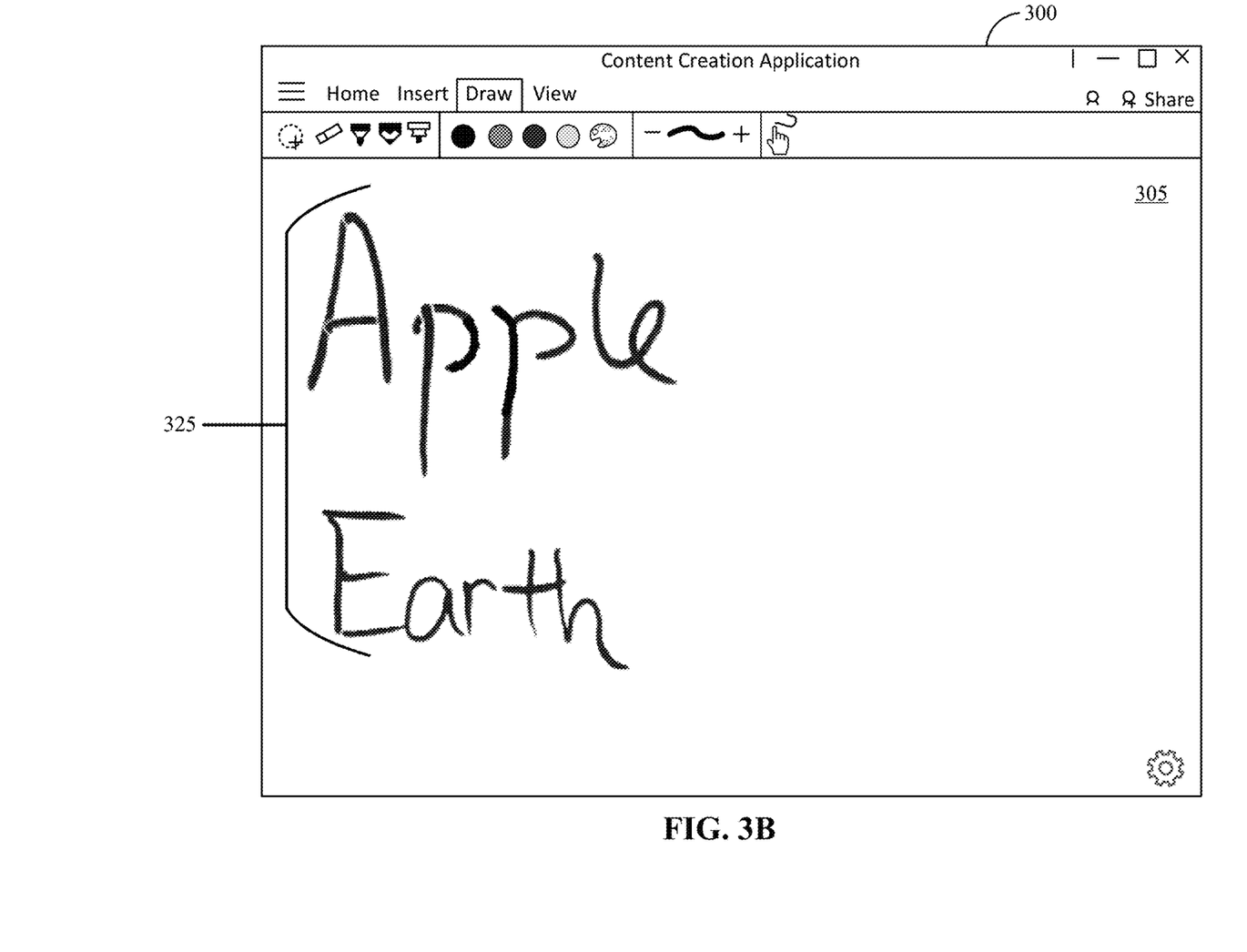

Referring to FIG. 3B, the user may input inked content 325 onto the canvas interface 305 of the content creation application 300 without the need for a keyboard. The inked content 325 may include inked terms or inked drawings. In some cases, ink analysis may be performed on the inked content 325 to identify at least one recognized term of the inked content 325. In this case, the inked content 325 may include handwritten inked words, such as the "Apple" and "Earth". Further, in this case, "Apple" and "Earth" are the recognized terms of the inked content 325.

Figure 3C:
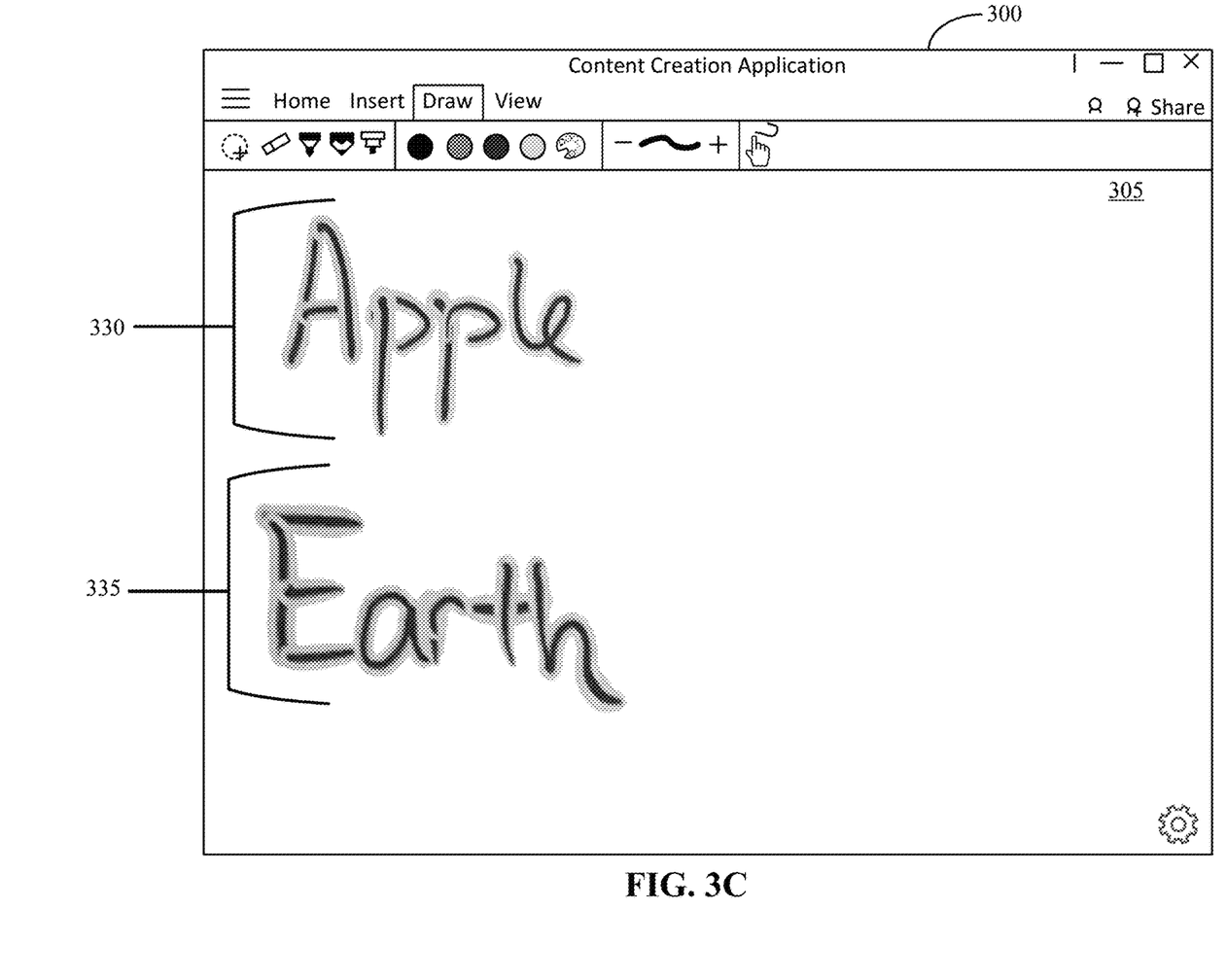

Referring to FIG. 3C, upon receiving the inked strokes, determining the inked content (e.g., grouping of strokes), and identifying recognized terms (as shown in FIG. 3B), the content creation application 300 can communicate with an ink augmenting service to perform any of the methods described with respect to the ink augmenting service and based on the keywords identified by the ink augmenting service, identify the ink content to transform into actionable items. The illustrated canvas interface 305 shows the recognized term "Apple" as actionable item 330 and the recognized term "Earth" as actionable item 335. Actionable item 330 and actionable item 335 are shown as highlighted terms on the illustrated canvas interface 305 of the content creation application 300. Each actionable item is one entity and a user may select the actionable item (e.g., actionable item 330 or actionable item 335) to receive additional content, identified by the ink augmenting service, for the recognized term corresponding to the actionable item.

Figure 3D:
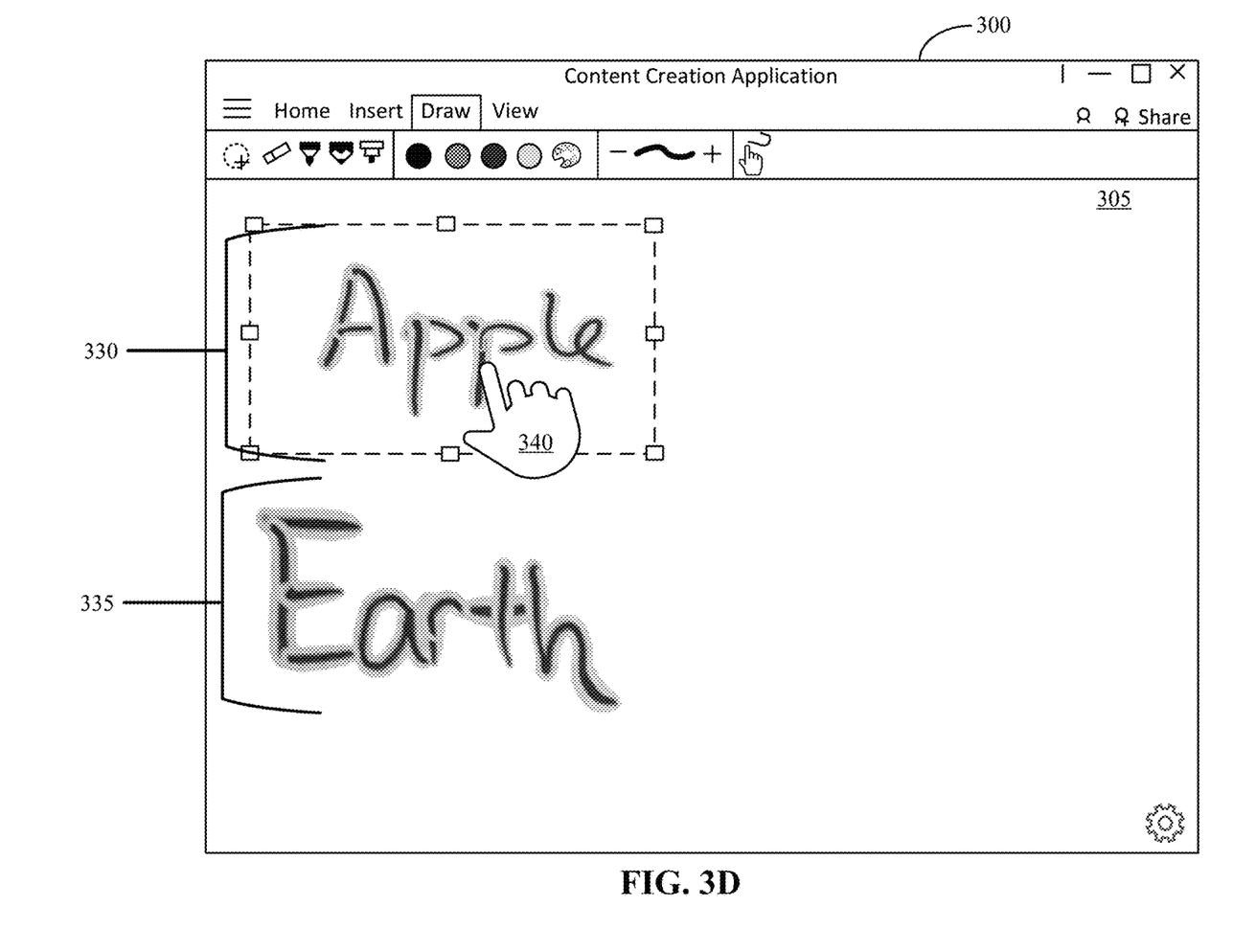

Referring to FIG. 3D, the user can select one or more actionable items (actionable item 330 and actionable item 335) in the canvas interface 305 of the content creation application 300 to receive the additional content related to the recognized term corresponding to the actionable item. In the example of FIG. 3D, the user may select (340) the actionable item 330 corresponding to the recognized term "Apple". The selection action may be any suitable input such as touch, encircle, and the like. Although a finger is illustrated as the inking input tool, a pen or stylus or other object may be used.

Figure 3E:
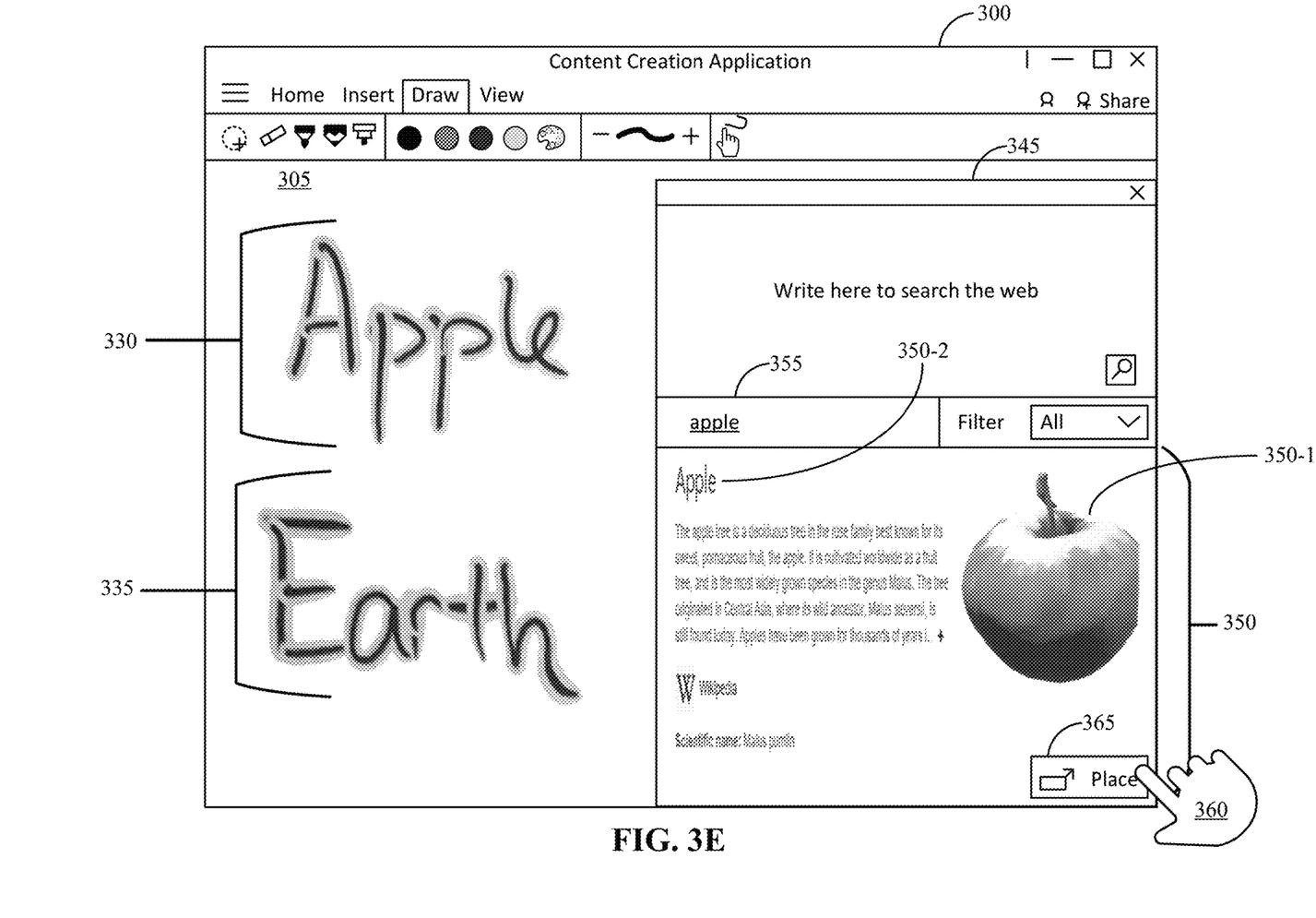

Referring to FIG. 3E, when the user selects one or more of the actionable items (as shown in FIG. 3D), a pop-out window 345 may be displayed that shows results 350 of a search of multiple sources (carried out by the ink augmenting service) using the recognized term corresponding to the selected actionable item 330. In the example of FIG. 3E, an input field 355 displays the recognized term "apple" corresponding to the selected actionable item 330. The results 350 may be presented as thumbnails, such as 3D content 350-1, and definition information 350-2. The user can select (360) an insert command 365 to insert one or more items of the results 350 into the canvas interface 305 of the content creation application 305.

In some cases, the field 355 displaying the recognized term of the inked word or inked drawing used to obtain the results 350 may be modified by the user. Further, the pop-out window 345 may display an alternative word list to the user. For example, if an ink analysis of a word, such as "volcano", surfaced a recognized term, such as "volume", the content creation application 300 can surface a list of three to five alternative words of a lower confidence. Therefore, if available content related to "volume", such as an image of a "volume bar", is displayed, the user can instead select the word "volcano" from the alternative word list.

Figure 3F:
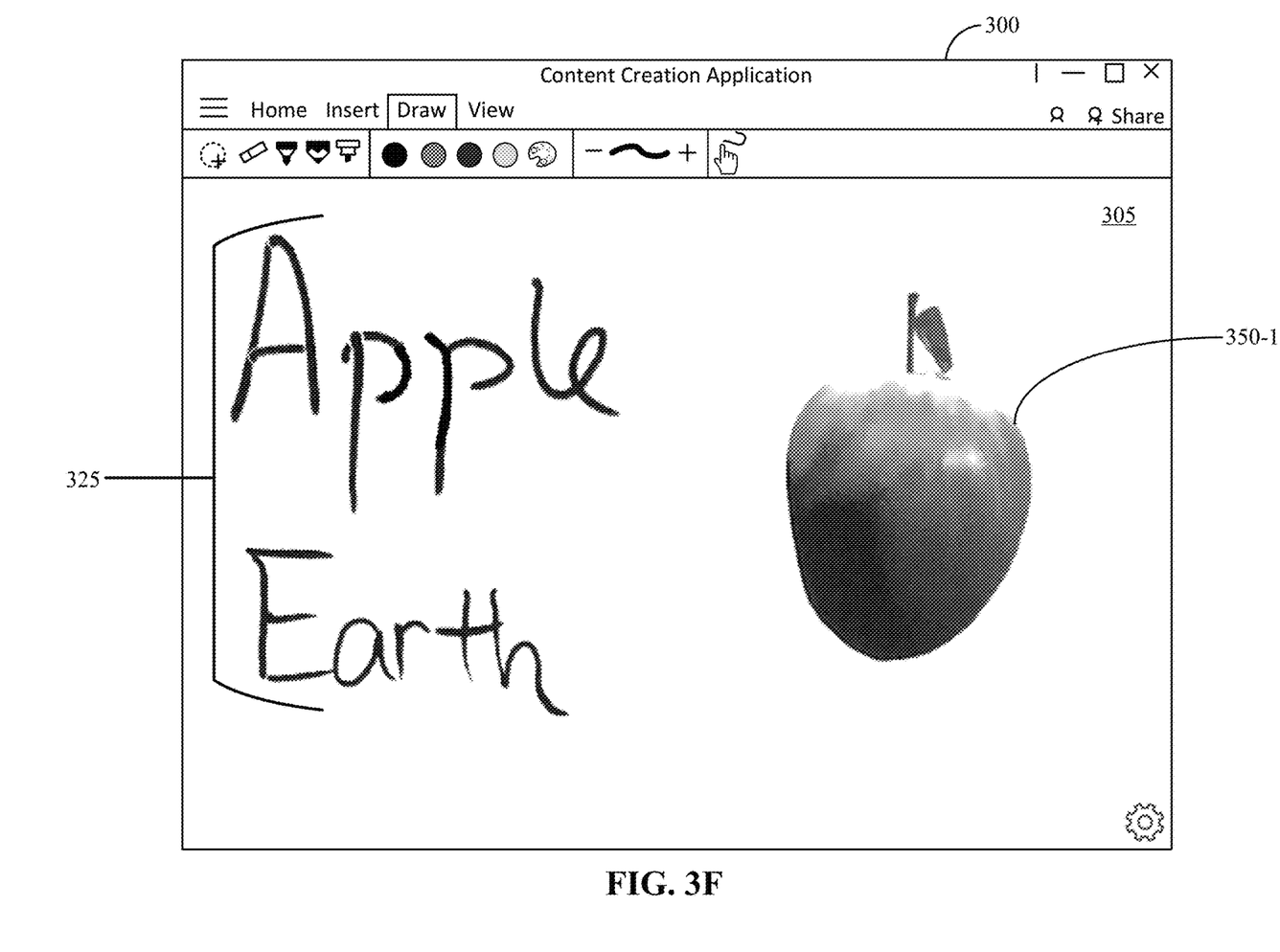

Referring to FIG. 3F, when the user selects one or more items of the results to insert into the canvas interface 305 (as shown in FIG. 3E), the selected result 350-1 is shown as embedded in the canvas interface 305. In some cases, a user may be able to modify or further interact with the selected result. For example, the selected result may be of an ink modifiable format (as opposed to a static drawing) or may be rotated even when embedded on the canvas interface 305. For example, the selected result 350-1 is a 3D image of an apple. The user may rotate the selected result 350-1 once the selected result 350-1 has been embedded in the canvas interface 305.

In the illustrated example, the pop-out window shown in FIG. 3E is removed from the canvas interface 305. In some cases, the pop-out window showing the results may remain displayed in the canvas interface 305 while the user is working in the content creation application 300. Additionally, in the illustrated example, the actionable items have been returned to the inked content 325. In some cases, the content creation application 300 may maintain the transformation of the inked content as actionable items until, for example, a user changes the settings of ink augmenting functionality of the content creation application 300.

FIG. 4 illustrates components of a computing device that may be used in certain embodiments described herein; and FIG. 5 illustrates components of a computing system that may be used to implement certain methods and services described herein.

Referring to FIG. 4, system 400 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, whiteboard, or a smart television. Accordingly, more or fewer elements described with respect to system 400 may be incorporated to implement a particular computing device.

System 400 includes a processing system 405 of one or more processors to transform or manipulate data according to the instructions of software 410 stored on a storage system 415. Examples of processors of the processing system 405 include general purpose central processing units, application specific processors, and logic devices, as well as any other type of processing device, combinations, or variations thereof. The processing system 405 may be, or is included in, a system-on-chip (SoC) along with one or more other components such as network connectivity components, sensors, video display components.

The software 410 can include an operating system 418 and application programs such as a content creation application 420 that calls the ink augmenting service as described herein. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system 418 may be implemented both natively on the computing device and on software virtualization layers running atop the native device operating system (OS). Virtualized OS layers, while not depicted in FIG. 4, can be thought of as additional, nested groupings within the operating system space, each containing an OS, application programs, and APIs.

Storage system 415 may comprise any computer readable storage media readable by the processing system 405 and capable of storing software 410 including the content creation application 420.

Storage system 415 may include volatile and nonvolatile, removable and non-removable media implemented in any method or technology for storage of information, such as computer readable instructions, data structures, program modules, or other data. Examples of storage media of storage system 415 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave.

Storage system 415 may be implemented as a single storage device but may also be implemented across multiple storage devices or sub-systems co-located or distributed relative to each other. Storage system 415 may include additional elements, such as a controller, capable of communicating with processing system 405.

Software 410 may be implemented in program instructions and among other functions may, when executed by system 400 in general or processing system 405 in particular, direct system 400 or the one or more processors of processing system 405 to operate as described herein.

The system can further include user interface system 430, which may include input/output (I/O) devices and components that enable communication between a user and the system 400. User interface system 430 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 430 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

For inclusion of the described inking feature, the user interface system 430 at least includes a digitizing pen or a touch-based user input interface. A touch-based user input interface can include a touchscreen and/or surface with sensing components for a digitizer. In some cases, a digitizing pen may be used in place of or as part of a touch-based user input interface.

Visual output may be depicted on the display (not shown) in myriad ways, presenting graphical user interface elements, text, images, video, notifications, virtual buttons, virtual keyboards, or any other type of information capable of being depicted in visual form.

The user interface system 430 may also include user interface software and associated software (e.g., for graphics chips and input devices) executed by the OS 418 in support of the various user input and output devices. The associated software assists the OS 418 in communicating user interface hardware events to application programs using defined mechanisms. The user interface system 430 including user interface software may support a graphical user interface, a natural user interface, or any other type of user interface. For example, the canvas interfaces for the content curation application 420 described herein may be presented through user interface system 430.

Network interface 440 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 418, which informs applications of communications events when necessary.

Certain aspects described herein, such as those carried out by the ink augmenting service described herein may be performed on a system such as shown in FIG. 5. Referring to FIG. 5, system 500 may be implemented within a single computing device or distributed across multiple computing devices or sub-systems that cooperate in executing program instructions. The system 500 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 500 can include a processing system 510, which may include one or more processors and/or other circuitry that retrieves and executes software 520 from storage system 530. Processing system 510 may be implemented within a single processing device but may also be distributed across multiple processing devices or sub-systems that cooperate in executing program instructions.

Storage system(s) 530 can include any computer readable storage media readable by processing system 510 and capable of storing software 520. Storage system 530 may be implemented as a single storage device but may also be implemented across multiple storage devices or sub-systems co-located or distributed relative to each other. Storage system 530 may include additional elements, such as a controller, capable of communicating with processing system 510. Storage system 530 may also include storage devices and/or sub-systems on which data such as inked drawing information is stored.

Software 520, including ink augmenting service 545, may be implemented in program instructions and among other functions may, when executed by system 500 in general or processing system 510 in particular, direct the system 500 or processing system 510 to operate as described herein for the ink augmenting service 545 (and its various components and functionality).

System 500 may represent any computing system on which software 520 may be staged and from where software 520 may be distributed, transported, downloaded, or otherwise provided to yet another computing system for deployment and execution, or yet additional distribution.

In embodiments where the system 500 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communication interface 550 may be included, providing communication connections and devices that allow for communication between system 500 and other computing systems (e.g., systems supporting services such as 114, 116, and 118 described with respect to FIG. 1) over a communication network or collection of networks (not shown) or the air.

Certain techniques set forth herein with respect to the content creation application and/or ink service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that, as used herein, in no case do the terms "storage media", "computer-readable storage media" or "computer-readable storage medium" consist of transitory carrier waves or propagating signals.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for augmenting digital ink strokes for content creation applications, the method comprising:
   receiving ink strokes input to a canvas interface of a content creation application;
   identifying at least one recognized term from the ink strokes, the at least one recognized term being a text-based version of the ink strokes;
   communicating the at least one recognized term identified from the ink strokes to an ink augmenting service;
   receiving at least one keyword from the ink augmenting service, each keyword being a corresponding recognized term of the text-based version of the ink strokes having available content identified by the ink augmenting service, the available content being identified from one or more sources other than that of the ink strokes;
   in response to receiving the at least one keyword, transforming a grouping of the ink strokes corresponding to the recognized term indicated by each keyword to an actionable item in the canvas interface, wherein transforming the grouping of the ink strokes to the actionable item comprises:
      grouping the ink strokes corresponding to the recognized term together as one entity; and
      transforming the one entity to the actionable item, the actionable item visually appearing in a form of selectable ink strokes;
   in response to receiving a selection of the actionable item, automatically providing for display results of the available content identified by the ink augmenting service for the recognized term of the actionable item;
   receiving a selection of one or more of the results of the available content; and
   inserting the selected one or more of the results of the available content in the canvas interface of the content creation application.

2. The method of claim 1, further comprising communicating context information to the ink augmenting service with the at least one recognized term.

3. The method of claim 1, wherein the transforming of the grouping of the ink strokes to the actionable item further comprises:
   assigning a value to a command parameter for the grouping of the ink strokes, the command parameter effecting a command action when at least a portion of the grouping of the ink strokes is selected.

4. The method of claim 1, wherein the transforming of the grouping of the ink strokes to the actionable item further comprises:
   applying a highlighting effect to the grouping of the ink strokes corresponding to the recognized term.

5. The method of claim 1, wherein the transforming of the grouping of the ink strokes to the actionable item further comprises:
   replacing the grouping of the ink strokes corresponding to the recognized term with an image or icon of ink strokes.

6. The method of claim 1, further comprising returning the selected actionable item to the ink strokes that were originally displayed.

7. The method of claim 1, wherein the selected one or more results replaces the selected actionable item.

8. The method of claim 1, wherein the available content comprises definition information, 3D content, an image, information related to context information, or a combination thereof.

9. A system for content creation, comprising:
   a user input interface;
   a processing system;
   a network interface;
   one or more storage media; and
   a content creation application with an ink augmenting feature stored on at least one of the one or more storage media that, when executed by the processing system, direct the processing system to:
   receive ink strokes input to a canvas interface of the content creation application;
   identify at least one recognized term from the ink strokes, the at least one recognized term being a text-based version of the ink strokes;
   communicate the at least one recognized term identified from the ink strokes to an ink augmenting service;
   receive at least one keyword from the ink augmenting service, each keyword being a corresponding recognized term of the text-based version of the ink strokes having available content identified by the ink augmenting service, the available content being identified from one or more sources other than that of the ink strokes;
   in response to receiving the at least one keyword, transform a grouping of the ink strokes corresponding to the recognized term indicated by each keyword to an actionable item in the canvas interface, wherein transforming the grouping of the ink strokes to the actionable item comprises:
grouping the ink strokes corresponding to the recognized term together as one entity; and
transforming the one entity into the actionable item, the actionable item visually appearing in a form of selectable ink stroke;
in response to receiving a selection of the actionable item, automatically providing for display results of the available content identified by the ink augmenting service for the recognized term of the actionable item;
receiving a selection of one or more of the results of the available content; and
inserting the selected one or more of the results of the available content in the canvas interface of the content creation application.

10. The system of claim 9, wherein the content creation application with the ink augmenting feature further directs the processing system to:
communicate context information to the ink augmenting service with the at least one recognized term.

11. The system of claim 9, wherein, to direct the processing system to transform the grouping of the ink strokes to the actionable item, the content creation application with the ink augmenting feature further directs the processing system to at least:
assign a value to a command parameter for the grouping of the ink strokes, the command parameter effecting a command action when at least a portion of the grouping of the ink strokes is selected.

12. The system of claim 9, wherein, to direct the processing system to transform the grouping of the ink strokes to the actionable item, the content creation application with the ink augmenting feature further directs the processing system to at least:
replace the grouping of the ink strokes corresponding to the recognized term with an image or icon of ink strokes.

13. The system of claim 9, wherein the available content comprises definition information, 3D content, an image, information related to context information, or a combination thereof.

14. One or more computer readable storage media having instructions for a content creation application with ink augmenting feature stored thereon what when executed by a processing system direct the processing system to at least:
receive ink strokes input to a canvas interface of the content creation application;
identify at least one recognized term from the ink strokes, the at least one recognized term being a text-based version of the ink strokes;
communicate the at least one recognized term identified from the ink strokes to an ink augmenting service;
receive at least one keyword from the ink augmenting service, each keyword being a corresponding recognized term of the text-based version of the ink strokes having available content identified by the ink augmenting service, the available content being identified from one or more sources other than that of the ink strokes;
in response to receiving the at least one keyword, transform a grouping of the ink strokes corresponding to the recognized term indicated by each keyword to an actionable item in the canvas interface, wherein transforming the grouping of the ink strokes to the actionable item comprises;
grouping the ink strokes corresponding to the recognized term together as one entity; and
transforming the one entity into the actionable item, the actionable item visually appearing in a form of selectable ink strokes;
in response to receiving a selection of the actionable item, automatically providing for display results of the available content identified by the ink augmenting service for the recognized term of the actionable item;
receiving a selection of one or more of the results of the available content; and
inserting the selected one or more of the results of the available content in the canvas interface of the content creation application.

15. The media of claim 14, further comprising instructions that direct the processing system to:
communicate context information to the ink augmenting service with the at least one recognized term.

16. The media of claim 14, wherein the instructions that direct the processing system to transform the grouping of the ink strokes to the actionable item further comprise instructions that direct the processing system to:
assign a value to a command parameter for the grouping of the ink strokes, the command parameter effecting a command action when at least a portion of the grouping of the ink strokes is selected.

17. The media of claim 14, wherein the instructions that direct the processing system to transform the grouping of the ink strokes to the actionable item further comprise instructions that direct the processing system to:
apply a highlighting effect to the grouping of the ink strokes corresponding to the recognized term.

* * * * *